(12) United States Patent
Kim

(10) Patent No.: US 6,414,269 B2
(45) Date of Patent: Jul. 2, 2002

(54) PIT AND BLOW HOLE RESISTANT FLUX-CORED WIRE FOR GAS-SHIELDED ARC WELDING OF GALVANIZED STEEL SHEET

(75) Inventor: Jongwon Kim, Changwon (KR)

(73) Assignee: Kiswel, Ltd., Kyoungnam (KR)

( * ) Notice: Subject to any disclaimer, the term of this patent is extended or adjusted under 35 U.S.C. 154(b) by 0 days.

(21) Appl. No.: 09/791,710

(22) Filed: Feb. 26, 2001

(30) Foreign Application Priority Data

Mar. 3, 2000 (KR) .............................................. 00-10761

(51) Int. Cl.[7] .............................................. B23K 35/02
(52) U.S. Cl. .............................. 219/145.22; 219/146.24; 219/146.3; 219/146.32
(58) Field of Search ........................ 219/145.22, 146.24, 219/146.3, 146.32; 148/24

(56) References Cited

U.S. PATENT DOCUMENTS 3,825,721 A * 7/1974 Carroll et al. ............... 219/146
4,086,463 A * 4/1978 Omori et al. ........... 219/145.22
4,282,420 A * 8/1981 Banks .................... 219/146.24

* cited by examiner

*Primary Examiner*—M. Alexandra Elve
(74) *Attorney, Agent, or Firm*—Bacon & Thomas

(57) ABSTRACT

The present invention discloses a pit and blow hole resistant flux-cored wire for gas-shielded arc welding of a galvanized steel sheet. Here, an amount of flux ranges from 10 to 20% by weight of the wire, and an amount of a mild steel sheath ranges from 80 to 90% by weight of the wire. The flux comprising iron powder, deoxidizer and arc stabilizer in a residual amount is filled in the mild steel sheath. In detail, the flux contains a slag generation agent in an amount of 2 to 15% by weight of the wire, silicon oxide in an amount of 1.0 to 10 wt %, a component containing at least two components containing metal titanium, selected from the group consisting of metal titanium, metal magnesium and alloy mixtures thereof in an amount of 0.4 to 3 wt %, and one of sodium fluoride and potassium fluoride in an amount of 0.1 to 1 wt %. Accordingly, even when a plated layer is thick, it is possible to minimize generation of pits and blow holes in the welding. Moreover, generation of fumes and spatters can be controlled, which results in improved weldability. As a result, the pit and blow hole resistant flux-cored wire can be efficiently used for a consecutive or automated welding process.

1 Claim, 3 Drawing Sheets

[Figure 1]
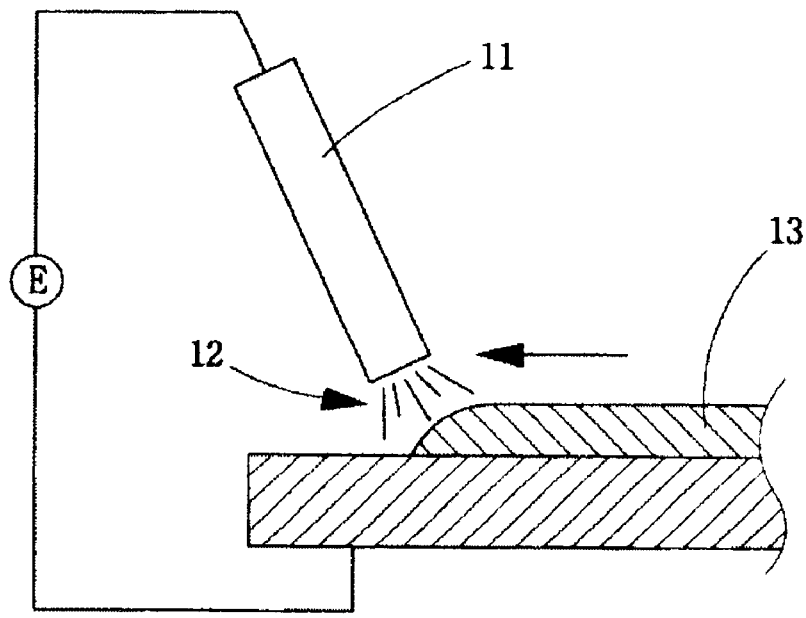
[Figure 2]
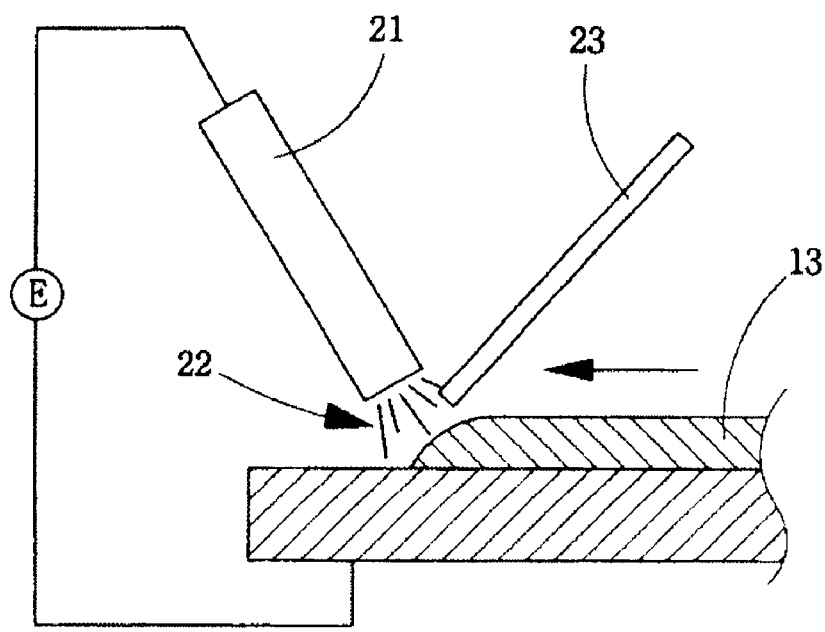

[Figure 3]
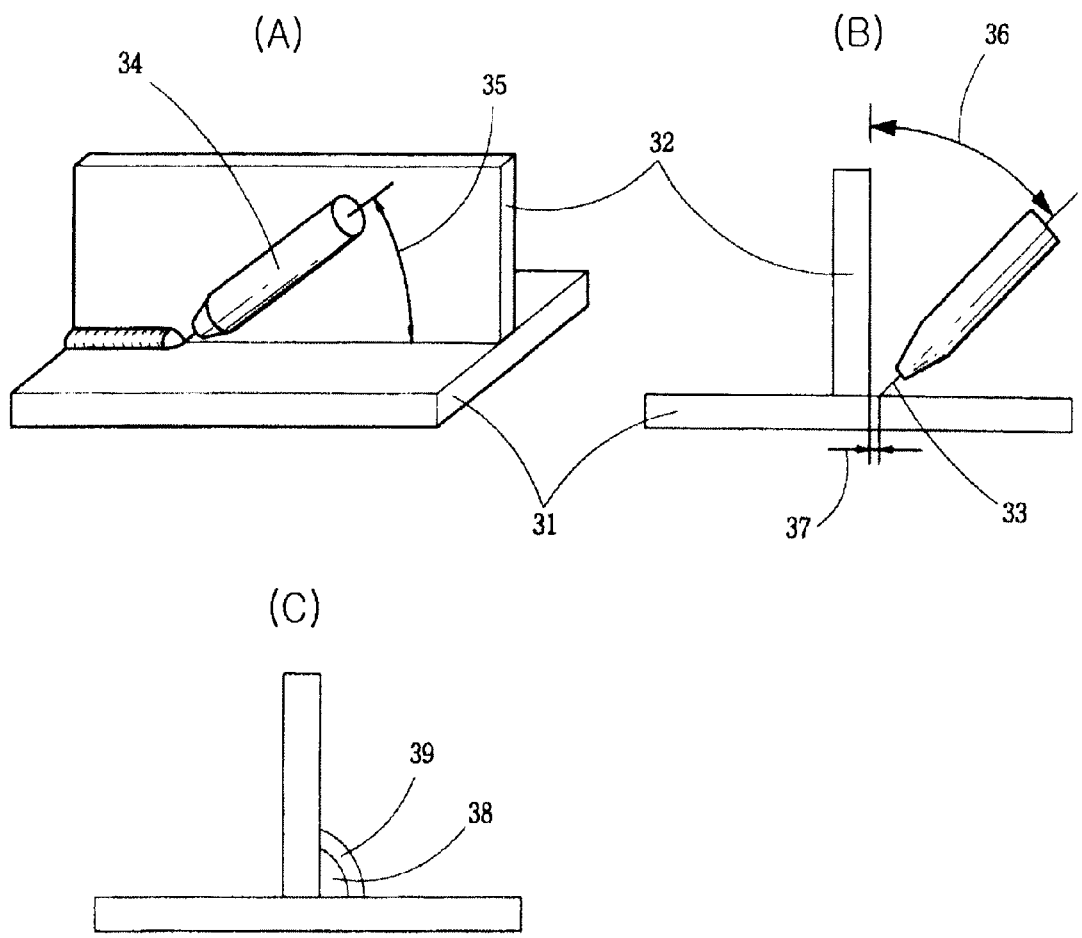

[Figure 4]
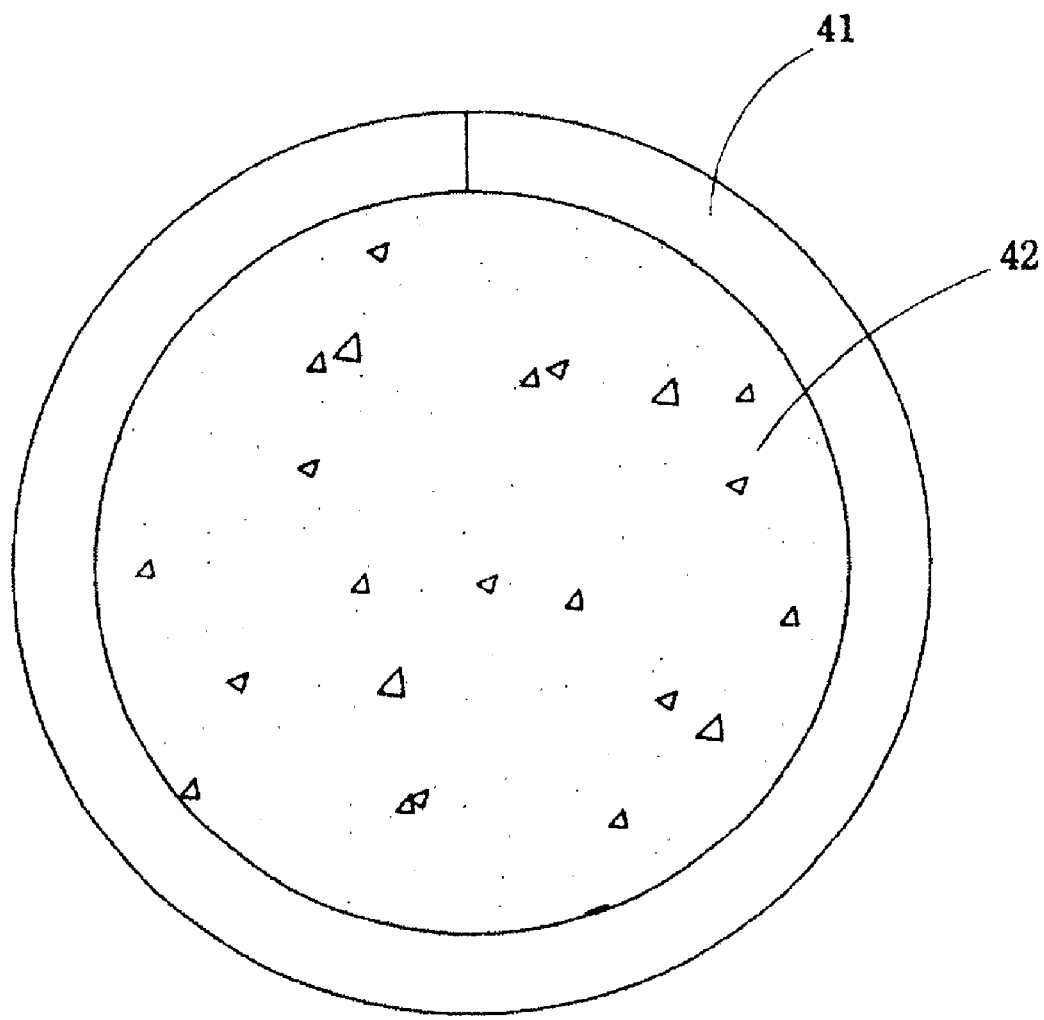

PIT AND BLOW HOLE RESISTANT FLUX-CORED WIRE FOR GAS-SHIELDED ARC WELDING OF GALVANIZED STEEL SHEET

BACKGROUND OF THE INVENTION

1. Field of the Invention

The present invention relates to a flux-cored wire for gas-shielded arc welding of a galvanized steel sheet, and in particular to an improved pit and blow hole resistant flux-cored wire for gas-shielded arc welding of a galvanized steel sheet which can efficiently prevent pits and blow holes from being generated in the gas-shielded arc welding of the galvanized steel sheet, by filling a flux containing titanium oxide, silicon oxide and alkali fluoride as slag generation agents in a mild steel sheath in an amount of 10 to 20% by weight of the wire.

2. Description of the Related Art

In general, the most widely-used welding method is an arc welding which combines base materials by generating an arc heat by applying a low voltage high current power between a welding material(electrode or filler metal) and a non-welding material(base material), and by melting the two materials by the arc heat. The arc welding is classified into the following two types.

In a consumable electrode arc welding, as illustrated in FIG. 1, a welding rod 11 served as an electrode and a base material are melted due to an arc heat 12 generated between the electrode and the base material, thus forming a weld metal 13, namely a bead on a weld zone. The consumable electrode arc welding includes a shielded arc welding, submerged arc welding, carbon dioxide arc welding and MIG welding.

In a non-consumable electrode arc welding, as shown in FIG. 2, an electrode 21 serves merely to generate an arc 22. It is thus required to melt a specific filler metal 23 in an arc generation range in order to obtain a weld metal. The non-consumable electrode arc welding includes a TIG welding and atomic hydrogen welding.

The arc welding methods except for the shielded metal arc welding (SMAW) prevent oxidation of a welding section where a liquid phase metal is formed due to the arc heat, or shield a contact between a molten metal and air by supplying an inert gas or carbon dioxide gas to the welding section so as to control an atmosphere of the molten metal. Accordingly, the arc welding methods are also called the gas-shielded arc welding.

The gas-shielded arc welding of high efficiency has been widely employed in various industrial fields such as vehicles, shipbuilding and construction. However, the welding of iron and steel materials has the following problems.

The iron and steel materials have excellent mechanical properties in spite of low price, but have a weak corrosion resistance. Therefore, in order to improve the corrosion resistance, the surface of the steel material may be galvanized with pure zinc or zinc alloy.

However, the plated layer on the surface of the iron or steel material may generate defects in the weld zone.

That is, the plated layer of the galvanized steel material consists of zinc having a low melting point and boiling point. As compared with the pure steel material, the arc weldability of the galvanized steel material is remarkably reduced, and welding defects are easily generated in the weld zone due to the following reasons.

The zinc of the welding section and the plated layer of a heat effect unit is heated over its boiling point by the heat generated in the arc welding. Here, the evaporated zinc gas penetrates into the molten metal of the welding section.

Accordingly, the zinc gas penetrating into the molten metal of the welding section remains in the bead after coagulation of the molten metal, thereby forming a space of an internal residual gas, namely a blow hole. In addition, the residual gas is discharged through the surface of the bead which is not completely coagulated, thereby forming a pit thereon.

The blow hole or pit generated due to the zinc gas weaken the weld zone, and thus reduce intensity of the steel material or cause cracks.

A conventional flux-cored wire for the gas-shielded arc welding of the galvanized steel material has been mostly used for the galvanized steel material for vehicles or light-weighted steel frames whose plated layer has a thickness below 20 $\mu$m.

However, when the flux-cored wire is used for the welding of a plated steel material whose plated layer has a thickness of 50 to 500 $\mu$m, a steel pipe whose plated layer has a groove, or a galvanized steel pipe such as an air conditioning pipe of ships, the blow holes or pits are seriously generated. In addition, the molten metal of the weld zone closes a supply nozzle of a shielding gas due to serious spattering, thereby reducing gas shield efficiency. It is thus difficult to consecutively perform the welding process.

Therefore, in order to stabilize the welding, the plated layer of the weld zone must be removed by grinding before the welding, the vaporized zinc gas must be easily discharged by increasing root intervals of the I-type joint welding, or zinc of the plated layer must be vaporized in advance due to increased preheating of a first welding, and then processed in a second welding or so. As a result, the weldability is considerably reduced.

SUMMARY OF THE INVENTION

Accordingly, an object of the present invention is to provide a flux-cored wire containing optimized flux components for welding which can restrict generation of pits and blow holes in the gas-shielded arc welding of a galvanized steel material, and which can control fumes and spattering to consecutively perform a welding process.

In order to achieve the above-described object of the present invention, there is provided a flux-cored wire for gas-shielded arc welding of a galvanized steel sheet wherein an amount of flux ranges from 10 to 20% by weight of the wire, an amount of a mild steel sheath ranges from 80 to 90% by weight of the wire, and a total amount of iron powder, deoxidizer and arc stabilizer in the flux ranges from 5 to 15% by weight of the wire, the flux comprising such components being filled in the mild steel sheath.

BRIEF DESCRIPTION OF THE DRAWINGS

The above objects, features and advantages of the present invention will become more apparent from the following detailed description when taken in conjunction with the accompanying drawings, in which:

FIG. 1 is a schematic structure diagram illustrating a consumable electrode arc welding;

FIG. 2 is a schematic structure diagram illustrating a non-consumable electrode arc welding;

FIG. 3 illustrates a welding process using a flux-cored wire in accordance with the present invention, wherein:

FIG. 3(A) is a perspective diagram;

FIG. 3(B) is a side diagram; and

FIG. 3(C) is a cross-sectional diagram; and

FIG. 4 is a cross-sectional diagram illustrating the flux-cored wire in accordance with the present invention.

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

In a flux-cored wire for gas-shielded arc welding of a galvanized steel sheet, as illustrated in FIG. 4, a flux 42 is filled in a mild steel sheath 41. Here, the flux contains a slag generation agent in an amount of 2 to 15% by weight of the wire, silicon oxide in an amount of 1.0 to 10 wt %, a component containing at least two components containing metal titanium, selected from the group consisting of metal titanium, metal magnesium and alloy mixtures thereof in an amount of 0.4 to 3 wt %, one of sodium fluoride and potassium fluoride in an amount of 0.1 to 1 wt %, and other components in a residual amount.

The respective flux components influence on the weldability by their content, as follows..

Firstly, when the slag generation agent containing titanium dioxide as a main component is used in an amount less than 2%, an arc formed in the welding is not stabilized, and thus a weld zone bead has a heterogeneous shape. Moreover, a spatter generation amount is increased in a molten metal of a welding section, and thus a supply nozzle of a shielding gas may be closed by the molten metal spattered. On the other hand, when the slag generation agent is used in an amount greater than 15%, pits and blow holes are seriously generated in the weld zone bead.

The silicon oxide also serves as the slag generation agent. When the silicon oxide is used in an amount less than 1%, it is difficult to remove glassy slag from the weld zone bead. In addition, the bead may be excessively convex. When the silicon oxide is used in an amount greater than 10%, the arc is unstably formed and the spattering is increased.

When the component containing at least two components containing metal titanium, selected from the group consisting of metal titanium, metal magnesium and alloy mixtures thereof is used in an amount less than 0.4%, the arc is unstably formed, and the pits and blow holes are seriously formed in the weld zone bead. Conversely, when the component is used greater than 3%, it is difficult to form a homogeneous shape of the weld zone bead due to the increased spattering.

In the case that one of sodium fluoride and potassium fluoride is used in an amount less than 0.1%, the arc is unstably formed. When it is used in an amount greater than 1%, the spattering is excessively generated and the fumes are increased.

The technical constitution and welding properties of the pit and blow hole resistant flux-cored wire for the gas-shielded arc welding of the galvanized steel sheet in accordance with the present invention will now be described in detail with reference to the accompanying drawings.

FIGS. 3(A) to 3(C) illustrate a preferred example of the welding process for examining the welding properties of the welding wire in accordance with the present invention.

As shown therein, in order to weld a sub base material 32 having an identical shape to a main base material 31 on the surface of the main base material 31 in a vertical direction, a horizontal slope angle 35 between a torch 34 for supplying a welding wire 33 and the surface of the main base material 31 ranges from 60 to 70°, and a vertical slope angle 36 between the torch 34 and the surface of the sub base material 32 is 45°. An interval 37 between the end of the welding wire 33 and the lower end of the sub base material 32 is greater than a diameter of the wire by 1 to 1.5 times. A secondary bead 39 is formed on a primary bead 38 according to two welding processes.

The flux-cored wire has a diameter of 1.2 mm. Here, the carbon dioxide arc welding is performed in a state where a welding current ranges from 180 to 280 A, a welding voltage ranges from 28 to 32 V, a shielding gas of carbon dioxide gas is supplied 20l per minute, and a welding speed is 30 cm per minute.

The two base materials for the welding are SS400(JIS G 3101) materials having a thickness of 19 mm, width of 100 mm and length of 500 mm, and being galvanized at a thickness of 100 to 500 μm. The sheath of the flux-cored wire consists of SPWB material which is a cold drawn steel. The sheath is used in an amount of 80 to 90% by weight of the wire employed, and the flux filled in the sheath is used in an amount of 10 to 20% by weight of the wire.

The content, porosity resistance and workability of the major flux components for the welding are shown in Table 1.

TABLE 1

| | | Flux composition (percent by weight of wire) | | | | | | Porosity | | work ability | Total evaluation |
|---|---|---|---|---|---|---|---|---|---|---|---|
| Items | | $TiO_2$ | Metal Mg | Metal Ti | Mn | $SiO_2$ | $Al_2O_3$ | Metal fluoride | resistance A | B | | |
| Inven- | 1 | 4.0 | 0.2 | 0.2 | 0.5 | 2.0 | 0.7 | 0.3 | ⊙ | ○ | ⊙ | ⊙ |
| tion | 2 | 4.0 | 0.2 | 0.2 | 1.0 | 2.0 | 0.7 | 0.3 | ⊙ | ○ | ⊙ | ○ |
| Exam- | 3 | 6.0 | 0.2 | 0.2 | 1.0 | 1.0 | 0.5 | 0.3 | ⊙ | ○ | ○ | ⊙ |
| ples | 4 | 6.0 | 0.3 | 0.1 | 1.0 | 1.0 | 0.5 | 0.3 | ⊙ | ⊙ | ○ | ○ |
| | 5 | 5.0 | 0.1 | 0.3 | 1.5 | 1.0 | 0.5 | 0.4 | ⊙ | ⊙ | ○ | ⊙ |
| | 6 | 5.0 | 0.1 | 0.3 | 1.5 | 2.0 | 0.7 | 0.4 | ○ | ○ | ○ | ○ |
| | 7 | 5.0 | 0.1 | 0.3 | 1.5 | 2.0 | 0.7 | 0.4 | ○ | ○ | ○ | ⊙ |

TABLE 1-continued

|  | Items | Flux composition (percent by weight of wire) | | | | | | | Porosity resistance | | work ability | Total evaluation |
|---|---|---|---|---|---|---|---|---|---|---|---|---|
|  |  | TiO$_2$ | Metal Mg | Metal Ti | Mn | SiO$_2$ | Al$_2$O$_3$ | Metal fluoride | A | B | | |
|  | 8 | 5.2 | 0.3 | 0.2 | 1.5 | 2.0 | 0.7 | 0.5 | ○ | ○ | ⊚ | ○ |
|  | 9 | 5.2 | 0.4 | 0.2 | 1.0 | 2.0 | 0.7 | 0.5 | ○ | ○ | ⊚ | ○ |
|  | 10 | 5.2 | 0.4 | 0.3 | 1.0 | 2.0 | 0.7 | 0.5 | ○ | ○ | ○ | ⊚ |
| Com- | 1 | 2.4 | — | 0.2 | 1.5 | 0.6 | 0.7 | — | Δ | X | ○ | X |
| para- | 2 | 2.4 | 0.1 | 0.2 | 1.5 | 0.6 | 0.7 | — | X | X | ○ | X |
| tive | 3 | 3.0 | 0.4 | — | 1.0 | 0.6 | 0.5 | — | X | X | ○ | X |
| Exam- | 4 | 3.0 | 0.4 | — | 1.0 | 4.0 | 0.5 | 0.5 | Δ | X | ○ | X |
| ples | 5 | 8.0 | 0.2 | 2.0 | 1.5 | 4.0 | 0.5 | 1.0 | ○ | ○ | X | X |
|  | 6 | 8.0 | 1.5 | 2.0 | 1.5 | 4.0 | 0.7 | 1.0 | Δ | X | X | X |

In Table 1, porosity resistance A and B respectively show evaluations for the number of the pits formed on the surface of the bead, and the number of the blow holes formed in the bead. The workability implies workability by spatter generation. Here, '⊚' implies when the pit and blow hole are not generated in 500 mm welding, 'O' implies when the number of the pits and blow holes is one to two, 'Δ' implies when the number of the pits and blow holes is three to five, and 'x' implies when the number of the pits and blow holes is over six.

In addition, the workability is relatively evaluated according to the spatter generation. When the three items of the porosity resistance and the workability include at least one 'x', the total evaluation is decided to be 'x'. Except for this, the relative evaluation is performed.

As shown in Comparative Examples 1 and 2 of Table 1, when the metal magnesium and metal titanium are used in an amount less than 0.4%, the pits and blow holes are increased. On the other hand, as shown in Comparative Examples 3 and 4, when the metal magnesium is used in an amount of 0.4% without the metal titanium, it is difficult to restrict generation of the pits and blow holes. Accordingly, addition of the metal titanium is essential.

The metal fluoride influences the spatters. In Comparative Examples 1 to 3, the porosity resistance is poor and the arc is not stabilized due to absence of the metal fluoride, but the workability is improved.

In Comparative Example 5, the porosity resistance is good, but the workability is low. At this time, although the entire content of the components exists in an allowable range, the content of the metal fluoride has a maximum value, the content of titanium dioxide which is a major slag generation agent has a high value, and thus a large amount of slag generated increases spattering.

In addition, in Comparative Example 6, the porosity resistance is poor because the total amount of the metal magnesium and metal titanium exceeds the allowable range.

Table 2 shows mechanical properties of the weld zones of Invention Examples and Comparative Examples.

TABLE 2

| Items | Mechanical properties | | |
|---|---|---|---|
|  | Tensile Strength (N/mm$^2$) | Elongation (%) | Impact value (0° C.) |
| Invention Examples | | | |
| 1 | 590 | 27 | 75 |
| 2 | 570 | 28 | 75 |
| 3 | 585 | 27 | 80 |
| 4 | 585 | 28 | 70 |
| 5 | 590 | 28 | 80 |
| 6 | 570 | 29 | 65 |
| 7 | 568 | 26.5 | 70 |
| 8 | 570 | 27 | 68 |
| 9 | 570 | 27.5 | 65 |
| 10 | 590 | 27 | 75 |
| Comparative Examples | | | |
| 1 | 580 | 24 | 55 |
| 2 | 550 | 27 | 60 |
| 3 | 540 | 26 | 55 |
| 4 | 570 | 24 | 40 |
| 5 | 590 | 27 | 40 |
| 6 | 580 | 24 | 40 |

The tensile strength and impact tests of Table 2 are performed according to JIS Z 3111.

As shown in Table 2, except for Comparative Examples 2 and 3, the samples of Invention Examples and Comparative Examples have similar tensile strength. However, all the samples of Comparative Examples have considerably reduced elongation and impact values.

That is, the pits or blow holes generated in the weld zone do not reduce the tensile strength but sharply decrease the elongation and impact values. In general, the weld zone is hardened by quenching, and thus is rarely varied in the tensile strength. However, brittleness is increased by hardening, and the pits or blow holes increase cracks. Accordingly, the pits or blow holes more weaken the weld zone.

As discussed earlier, in accordance with the present invention, even when the plated layer is thick, it is possible to minimize generation of the pits and blow holes in the welding. Moreover, generation of the fumes and spatters can be controlled, which results in improved weldability. As a result, the pit and blow hole resistant flux-cored wire can be efficiently used for a consecutive or automated welding process.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A pit and blow hole resistant flux-cored wire for gas-shielded arc welding of a galvanized steel sheet wherein an amount of a mild steel sheath filled with flux ranges from 80 to 90% by weight of the wire, and an amount of the flux ranges from 10 to 20% by weight of the wire, silicon oxide in an amount of 1.0 to 10 wt % by weight of the wire, a component containing at least two components containing metal titanium, selected from the group consisting of metal titanium, metal magnesium and alloy mixtures thereof in an amount of 0.4 to 3 wt % by weight of the wire, one sodium fluoride and potassium fluoride in an amount of 0.1 to 1 wt % by weight of the wire, and iron powder, deoxidizer and arc stabilizer in a residual amount.

* * * * *